United States Patent [19]

Berchem et al.

[11] Patent Number: 4,771,803
[45] Date of Patent: Sep. 20, 1988

[54] BALL COCK WITH SINTER CERAMIC VALVE SEAT AND VALVE BALL

[75] Inventors: Rütger Berchem, Gelsenkirchen; Georg Prokscha, Recklinghausen, both of Fed. Rep. of Germany

[73] Assignee: B+S Metallpraecis Gesellschaft fur Metallformgsbung m.b.H., Gelsenkirchen, Fed. Rep. of Germany

[21] Appl. No.: 101,187

[22] Filed: Sep. 25, 1987

[30] Foreign Application Priority Data

Sep. 26, 1986 [DE] Fed. Rep. of Germany ....... 3632858

[51] Int. Cl.⁴ ................................................. F16L 7/00
[52] U.S. Cl. .................................... 137/375; 251/315; 251/316; 251/368
[58] Field of Search ........................ 251/368, 315, 316; 137/375

[56] References Cited

U.S. PATENT DOCUMENTS

| | | |
|---|---|---|
| 3,592,440 | 7/1971 | McFarland .......................... 251/315 |
| 4,136,709 | 1/1979 | Rogers et al. ........................ 137/375 |
| 4,524,946 | 6/1985 | Thompson ........................... 251/316 |

FOREIGN PATENT DOCUMENTS

| | | |
|---|---|---|
| 3545547 | 7/1987 | Fed. Rep. of Germany . |
| 1327279 | 4/1963 | France ................................ 251/306 |

Primary Examiner—A. Michael Chambers
Attorney, Agent, or Firm—Herbert Dubno

[57] ABSTRACT

A ball cock having sinter ceramic valve ball and seat rings, also has wear-resistant bushings between the pipe connectors joined to the ends of the housing sleeve and the seat rings. Compressible seals bearing upon the bushings and clamped between the bushings and the pipe connectors press the bushings against the seat rings and the seat rings against the valve ball.

12 Claims, 4 Drawing Sheets

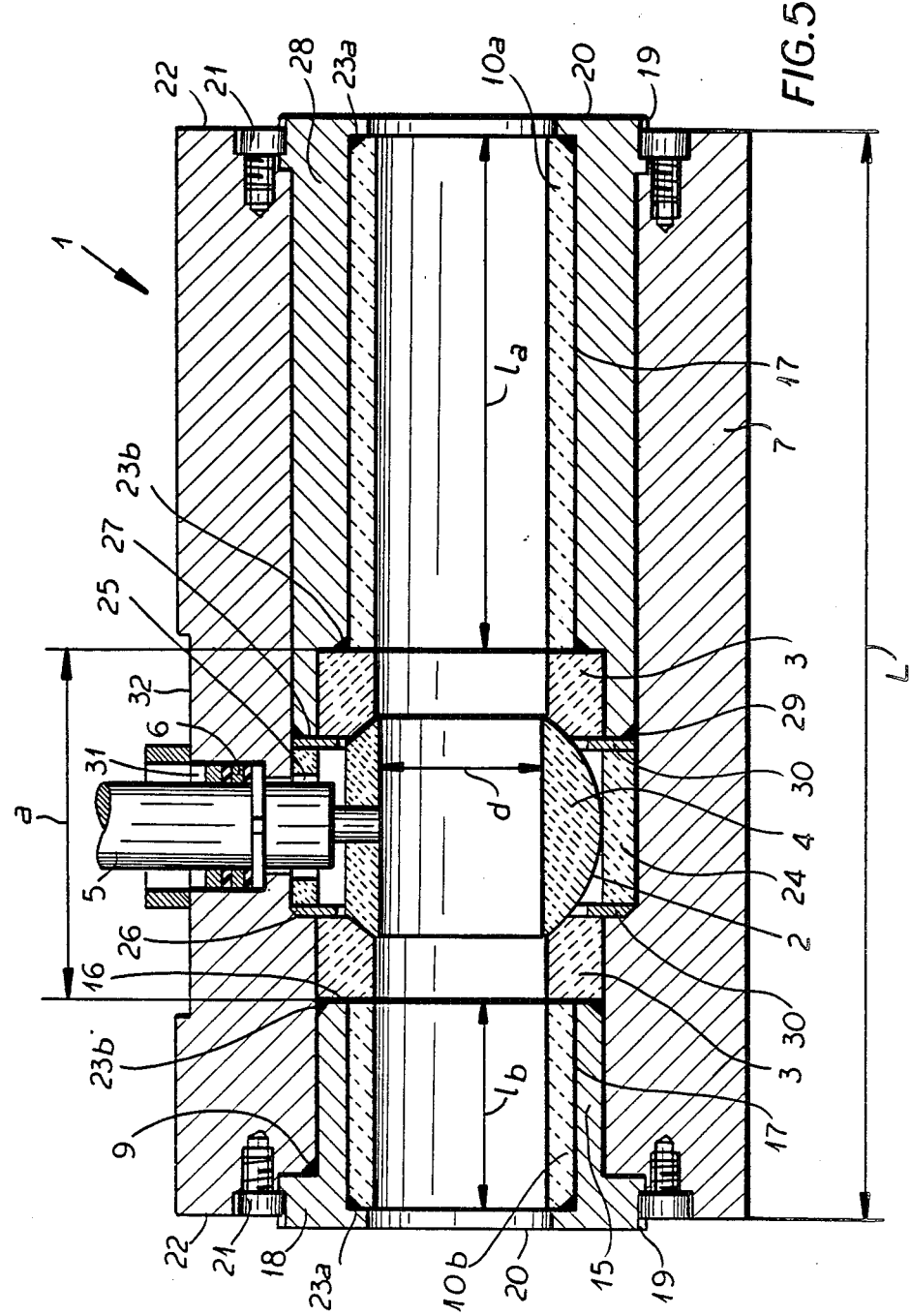

BALL COCK WITH SINTER CERAMIC VALVE SEAT AND VALVE BALL

FIELD OF THE INVENTION

Our present invention relates to a ball cock, especially for flowable materials, hereinafter fluids, containing abrasive particles, e.g. as additives, materials entrained by liquid, solids formed from the liquid or other materials. More particularly, the invention relates to a ball cock for this purpose and of the type which comprises a pressure-resistant or pressure-sustaining housing, also referred to as a pressurizable housing, a valve seat formed by a sinter ceramic seat ring, a sinter ceramic valve ball having a shaft or stem for actuating the valve ball by rotating it, and a shaft seal surrounding the shaft or stem and sealing the latter with respect to the valve housing. The housing generally is formed in one piece and is provided at its ends with pipe-connecting elements which are affixed to the housing and engage seals which are interposed between the pipe-connecting means and the housing. The valve seat is usually pressed against the valve ball.

BACKGROUND OF THE INVENTION

German patent document No. 35 45 547 discloses a ball cock in which the valve seat is received in a pressurizable housing shell which has an overall length substantially equal to that of the valve seat so that, when the pipe-connecting elements are affixed to the ends of the housing, the resilient and deformable seals are braced directly by the pipe-connecting elements against the seat. The pipe-connecting elements can have flanges which are connected across the length of the housing, outwardly of the latter, by tie bolts.

The elasticity of the seals provide resilient bias of the seat rings against the valve ball. The ceramic wear parts of the valve do not bear the force of pressure within the valve, the force being borne by the surrounding pressurizable housing shell. Thus the radially effective operating pressure, the bending moments of axially effective tension forces applied by the pipeline to the valve are all taken up directly by the housing.

This construction has been very successful. However, problems are encountered when the valve ball is intended to function as a throttle for abrasive fluids containing solid particles An increase in the flow velocity in the region of any throttling gap with the valve ball in a partially closed state, together with a strong turbulence in the flow path downstream of the throttle opening gives rise to a rapid wear in the region of the pipe-connecting elements, in the region of the adjacent pipes of the pipeline and in the region of the resilient seal since these elements have no effective wear protection.

OBJECTS OF THE INVENTION

It is the principal object of the present invention to provide a ball cock operating in accordance with the aforedescribed principles which is better able to resist wear in use with abrasive gaseous or liquid fluids containing solid particles.

Another object of our invention is to provide an improved ball cock which can be used to throttle the flow of an abrasive fluid-containing solid particles without undue wear of the pipe-connecting elements or in the region of connection of the pipes of the pipeline in which the cock is provided, are connected or adjoin the valve.

SUMMARY OF THE INVENTION

These objects are attained, in accordance with the invention, in a ball cock for fluids containing abrasive particles in which the length of the housing shell, preferably in the form of a one-piece valve-housing sleeve, is larger than the axial length of the valve seat (which can be formed by a pair of seat rings braced against the valve ball).

Between the pipe-connecting elements and the valve seat, respective tubular wear bushings are provided, e.g. of sinter ceramic, and abut the compressible seals at their ends opposite those which are braced against the seat rings.

The tubular wear bushings, moreover, are readily braced in the housing either directly, or through the intermediary of a tubular portion of the respective connecting element into which the ceramic wear bushing fits.

Preferably the length of the housing is at least twice the axial length of the valve sleeve.

The term "wear bushing" is here used to mean a sleeve or tube of a wear-resistant material, preferably of a sinter ceramic. The term "sinter ceramic" is here used to refer to a ceramic formed by sintering ceramic particles. A typical sinter ceramic is silicon carbide. Other sinter ceramics can also be used, for example sintered corundum. Hereinafter in this description all references to ceramic will be understood to be references to a sinter ceramic as this term has been defined.

In the valve or cock of the invention all of the ceramic wear parts are protected in a rigid housing from bending and tensile stresses. The ball cock is intrinsically pressure tight since the pipe-connecting elements press the compression seals against the wear bushings, which, in turn, urge the seat rings against the valve ball without danger that wear will adversely affect the seal.

In the event an internal pressure arises which might exceed the technological maximum value assigned to the ceramic material, the excessive force is braced directly or indirectly against pressurizable housing to ensure reliability of the valve operation.

According to the invention, the ball cock is not only wear resistant in the region of any sealing gap between the valve ball and the seat ring, but is also wear resistant in the flow passage through housing which is completely lined with ceramic by virtue of the presence of the wear bushings. Even when the abrasive stresses are considerable, there is no danger that the pipe connectors will be subjected to the abrasive wear.

The invention is based upon the fact that the greatest wear effect is in the region of the cross section, reduction resulting from rotation of the valve ball and thus occurs over a length which is approximately three times the free opening of the throttle cross section. In this region the valve is protected by the wear bushings.

The wear bushings can have equal wall thicknesses and can be braced directly against the housing sleeve, as already noted. However, it is not necessary to provide sinter ceramic bushings of a large thickness which this would entail.

Accordingly, it is a feature of the invention to provide the ceramic bushings in and as linings for respective spacer sleeves which are braced radially against the wall of the bore formed in the housing.

When the ball cock is used in a pipeline for a liquid in which a crystallization process is under way, there is a danger that deposits will bake the spacer sleeve in place and prevent or render difficult the removal of the ceramic bushing and/or the spacer sleeve. In this case, it has been found to be advantageous to form the connecting means as sleeve-like elements, i.e. compression sleeves, which extend from opposite ends into the bore of the housing, receive the wear bushings and have compression surfaces which bear directly upon the seat rings. In this case, the compression sleeves can each form a respective annular chamber accommodating the respective wear sleeve.

In this case, especially where the pipe-connecting element has a flange lying at the outer end of the housing, a pulling tool or the like can be affixed to the compression sleeve for removing it from the housing.

According to a feature of the invention, each compression sleeve is formed with an outer flange which is seated in a recess opening axially in the end face of the housing and is held in place by countersunk screws so that only a sealing boss of the compression sleeve projects axially beyond the respective end face.

It has been found to be advantageous to provide the ball cock as symmetrical between the inlet and outlet ends so that the inlet side and outlet side wear bushings are of the same length.

However, the wear downstream of the throttle opening is greater than the wear upstream of the throttle opening and thus it is a feature of the invention to offset the valve seat and valve ball from the longitudinal center of the housing toward the inlet side so that the wear bushings at the outlet side will have a greater length than the wear bushing at the inlet side.

It has been found to be advantageous, moreover, to provide on the periphery of the valve bore a support ring of wear resistant material, e.g. a sinter ceramic, which lies against the housing wall and is formed with a hole traversed by the actuating shaft or stem and registering with the transverse bore in the wall of the housing at which the shaft seal is provided. The support ring is held in place in the longitudinal direction between two abutment surfaces.

The use of a ceramic support ring has been found to be highly desirable when the housing itself is composed of a relatively soft material. Because of the very smooth wear-resistant contact surface between valve ball and support ring, a caking up of the valve ball is prevented and easy actuation of the valve is ensured over a long operating period.

Since, under highly throttled conditions, flow-related vibrations can arise and can apply stress to the contact surfaces of the periphery of the valve ball, any detrimental effect can be eliminated by the use of the support ring and the abutment surfaces. The abutment surfaces between which the support ring is fixed can be formed by the ends of the spacer sleeves pressed inwardly between the pipe-connecting elements.

Preferably, however, while one of the pipe-connecting elements forms an abutment surface for the support ring, preferably via a soft or compressible seal and/or if desired, the intermediary of an annular disk or washer, the other abutment surface is formed directly by a step or shoulder in the housing. A fixed abutment surface of the latter type greatly simplifies the mounting and positioning of the support ring.

It will be apparent that in the latter case, a pipe-connecting element not only forms the compression sleeve for the support ring and a compression sleeve for the seat ring, but also forms a spacer sleeve radially surrounding the tubular bushing and a compression member axially bearing thereon. This pipe-connecting element, therefore, will have a first abutment surface for the support ring, a second compression surface the the valve seat, and an annular chamber for receiving the wear bushing.

The wear protection by wear bushings upstream and downstream from the valve ball permits the housing to be fabricated as desired from metallic or nonmetallic materials. If a metallic material is selected, it is advantageous to form the housing as a thick-walled cylindrical hollow forging and to provide the shaft seal in a recess of this housing. Alternatively, especially when a light weight valve is desired, the valve housing can be formed as a thick-walled hollow cylinder of fiber-reinforced synthetic resin and the shaft seal provided in a recess of this structure.

The ball cock of the invention is characterized by a high degree of reliability in that it is pressure tight in and of itself. Even if a pressure overload or temperature shock causes breakage of the ceramic, the pressure is retained and function is maintained.

Wear protection to overcome the drawbacks of the prior art valve is assured.

The valve has been found to be particularly advantageous when it is used as a throttle valve with gaseous or liquid fluids containing abrasive particles. In the region of the ball, turbulence is reduced and the abrasive effect countered by the wear resistant bushings.

The valve is simple and can be readily assembled and disassembled. The disassembly allows replacement of the ceramic elements upon damage from thermal shock or the like in a rapid manner. Disassembly is permitted even in the case of crystallization of solids in the valve. During standstill of the pipeline and long interruption of operations, where disassembly and cleaning may be required, the valve is particularly suitable.

BRIEF DESCRIPTION OF THE DRAWING

The above and other objects, features and advantages of the present invention will become more readily apparent from the following description, reference being made to the accompanying drawing in which:

FIG. 5 is an axial section of an embodiment generally similar to that of FIG. 4 but with an asymmetric configuration.

SPECIFIC DESCRIPTION

Figure 1:
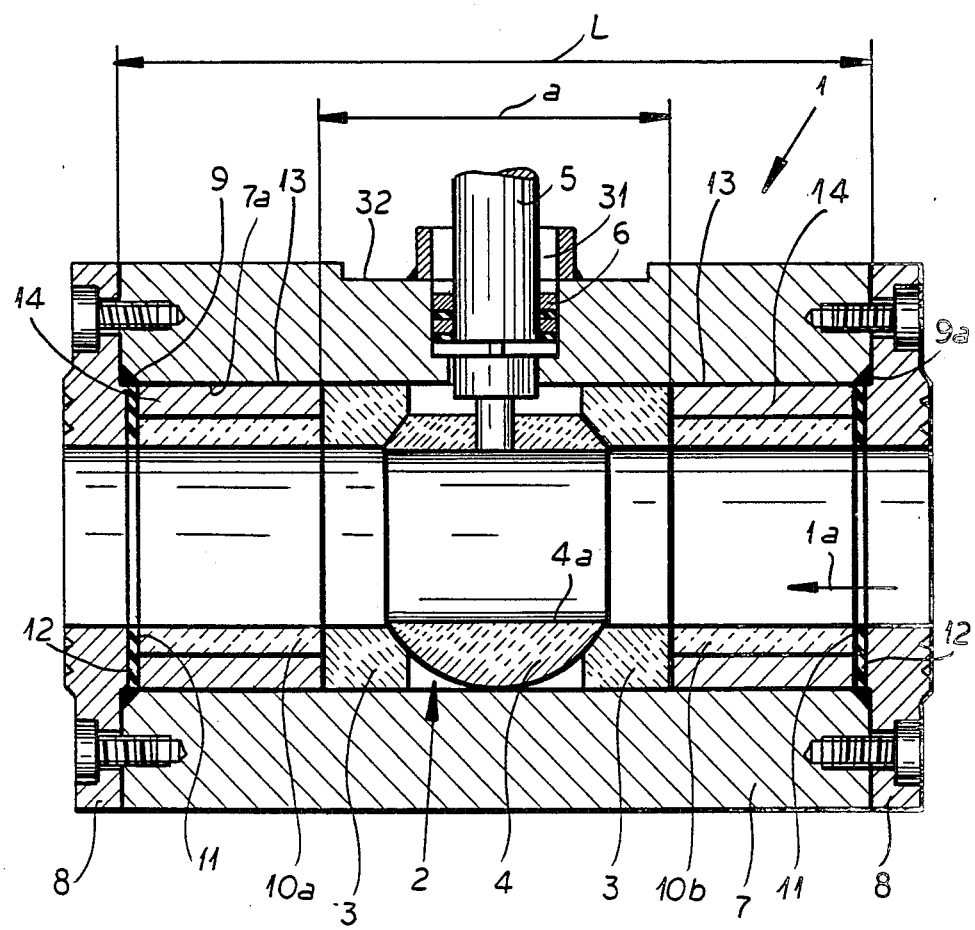
FIG. 1 is an axial section through a first embodiment of the ball cock of the invention.

The ball cocks shown in the drawing are especially useful as throttle valves in pipelines for fluids containing abrasive solid particles.

The basic construction of all of the embodiments includes a pressurizable housing 1, a valve seat 2 formed from a pair of ceramic seat rings 3, a ceramic valve ball 4, provided with a passage 4a and an actuating shaft or stem 5, and a shaft seat 6 which seals between the stem 5 and the housing 1 (see especially FIG. 1).

The housing 1 is formed as a one-piece housing sleeve 7 and is provided at its ends with pipe-connector elements 8 sealed with respect to the housing by elastomeric compressible seals 9. These seals may be O-rings.

The housing sleeve 7 has a length L which is greater than the axial length a of the valve seat 2. Preferably, the length L is at least twice the length a.

Between pipe connector elements 8 and the valve seat 2, respective wear bushings 10a and 10b are compressed.

These bushings bear at one annular surface against the respective seat rings and at their annular end face opposite the seat ring, at 11, bearing against the compressible seals 12 (FIG. 1) which are here interposed between the connecting elements 8 and the ceramic bushings. Between the wall 7a of the bore of the housing sleeve 7 and the wear bushing 10a or 10b, a spacer sleeve 14 is provided whose outer surface 13 bears against this wall in a pressure-transmitting relationship. The resilient seals 12 are under elastic compression and act on the one hand as static sealing elements and, on the other hand, as a force-generating means for pressing the bushings against the seat rings 3 to hold the seat rings under prestress against the valve bore.

In this embodiment and in the embodiments to be described, the valve is operated by rotating the shaft 5 to disalign the passage 4a from the passage 1a formed through the valve. The connectors 8 can be attached, e.g. by welding to respective pipes of the pipeline.

Figure 2:
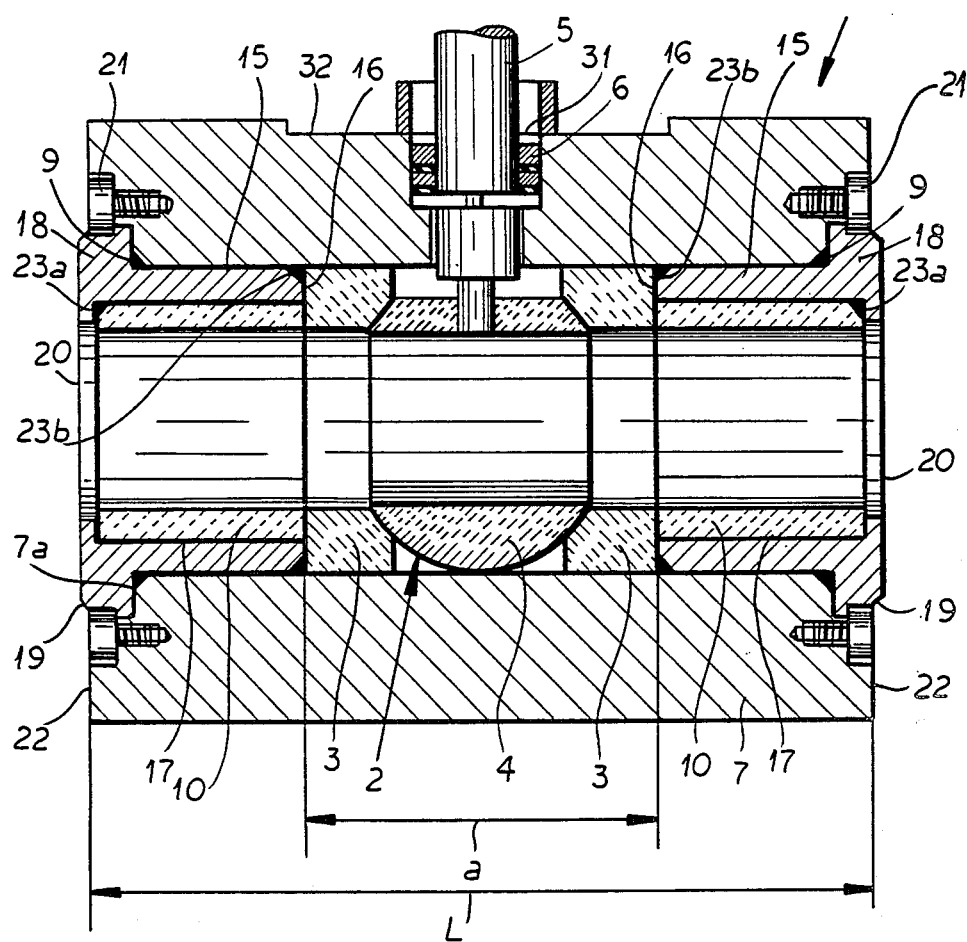
FIG. 2 is a similar view of a second embodiment.

The embodiment shown in FIG. 2 provides, in place of the spacer sleeves 14, pipe connectors which comprise compression sleeves 15 extending into the housing 7 from the opposite axial ends.

Figure 3:
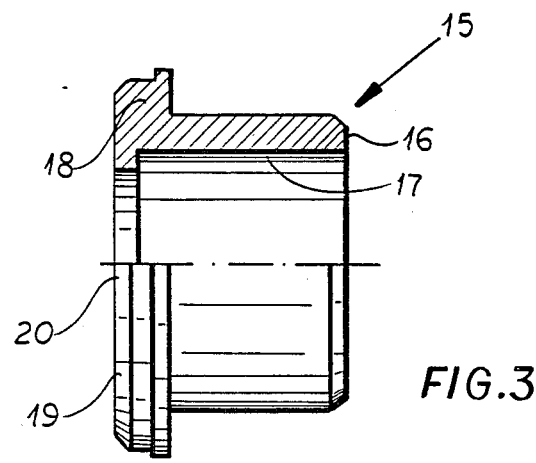
FIG. 3 is an elevational view, partly broken away, of a pipe-connecting element as used in the embodiment of FIG. 2.

As can also be seen from FIG. 3, each of the compression sleeves 15 has a compression surface 16 adapted to bear directly upon the respective seat ring 3 and forms an annular chamber 17 for receiving the respective ceramic wear bushing 10.

Furthermore, the compression sleeve 15 has an outwardly-extending flange 18 which engages in a recess 7a in the respective end of the housing sleeve 7 so that only a sealing boss 19 of a sealing surface 20 projects axially beyond the end face 22 of the sleeve 7. This boss provides a flange seal for a flange of a pipeline, not shown, which can be clamped against the valve using tie bolts in the manner described in the aforementioned German patent document.

The flange 18 is bolted to the housing sleeve 7 by countersunk screws 21.

The screws 21 serve only for mounting the compression sleeves and are not under forces generated by fluid pressure.

Between the compression surface 16 and the seat ring 3 and between the flange 18 and the bushing 10, respective compressible seals 9 and 23b are provided, e.g. O-ring seals. A similar seal is provided at 23a between the compression sleeve 15 and the respective ceramic bushing 10. The seals 23a and 23b thus function as static sealing elements and to provide the elastic bias holding the bushings against the seat rings and the seat rings against the ball.

Figure 4:
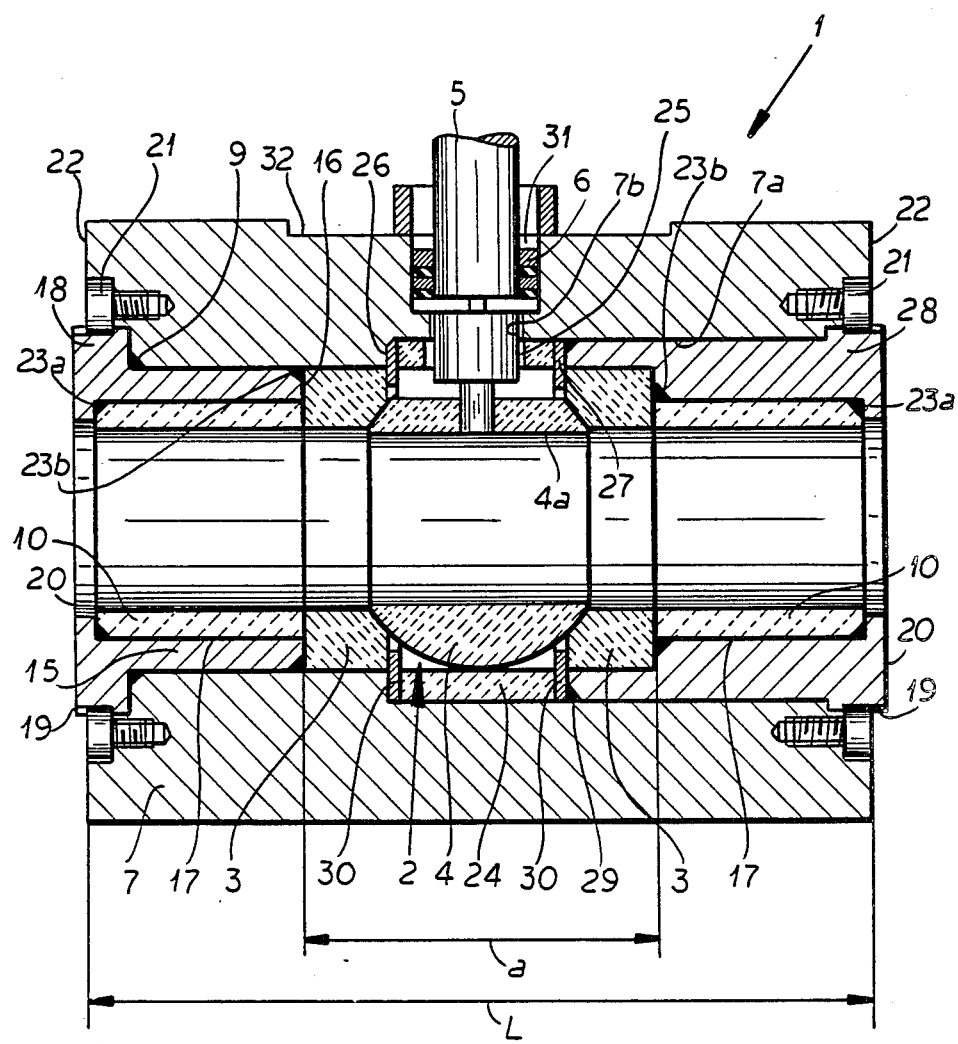
FIG. 4 is an axial section through a preferred embodiment of the invention.

The embodiment of FIG. 4 has a support ring 24 of wear-resistant material, preferably a sinter ceramic, surrounding the valve ball. The support ring 24 lies against the wall 7a of the housing sleeve 7 and has a hole 25 through which the shaft 5, which traverses a transverse bore 7b in the housing, can pass.

The support ring 24 in the illustrated embodiment is held between abutment surfaces 26 and 27. In FIG. 4, one of the abutment surfaces 26 is formed as a fixed abutment and has a shoulder of the housing sleeve 7.

One pipe-connector element 28, which at the same time serves as a compression sleeve for a seat ring 3 and to retain a ceramic bushing 10, forms the other abutment surface 27.

On the abutment surface 27, a compressible seal 29 is provided, e.g. in the form of an O-ring. In addition, washers or annular plates 30 can be interposed between the abutments and the support ring and can serve as additional security elements for retaining the seat rings in position.

In the embodiment of FIGS. 1-4, the wear bushings 10, 10a, 10b have the same axial lengths. Here the valve ball 4 is always axially centrally located.

In the embodiment of FIG. 5, however, the ball and seat are axially offset so that the bushing 10a at the outlet side has a greater length $1_a$ than the bushing 10b at the inlet side, in the direction of fluid flow, which has a length $1_b$.

The length of the outlet-side sleeve is so selected that turbulence will decay within the sleeve 10a. Preferably the length $1_a$ is three times the diameter of the passage in the ball 4.

In all of the embodiments, the housing sleeve 7 can be a thick-walled cylindrical forging or a fiber-reinforced synthetic resin. The shaft seal 6 for the shaft 5 is provided in a recess 31 of the housing sleeve 7. Finally the housing 7 has a planar mounting surface for connection of actuating and servocontrol valve-operating elements.

We claim:

1. A ball cock for a fluid containing abrasive particles, comprising:
    a generally cylindrical one-piece pressure-sustaining valve-housing sleeve with an axially extending bore having a peripheral cylindrical wall;
    connecting means at each end of said valve-housing sleeve for connecting said valve-housing sleeve in a pipeline traversed by the fluid;
    a sinter ceramic valve ball traversed by a passage and rotatable in said valve-housing sleeve for controlling flow through the ball cock, said ball having an axially extending wear surface forming a wall of said passage;
    a pair of sinter ceramic valve seat rings in said valve-housing sleeve spaced inwardly from said ends and flanking said ball, each of said rings having:
        an inner annular face abutting said valve ball,
        an outer annular face opposite said inner face and turned toward the respective end,
        an outer peripheral surface surrounded by and in contact with said peripheral cylindrical wall, and
        an axially extending wear surface constituting an inner peripheral surface of the respective ring;
    an actuating shaft connected to said valve ball for rotating same, said valve-housing sleeve being formed with a transverse bore traversed by said shaft;
    means forming a shaft seal in said transverse bore around said shaft for sealing same against escape of said fluid from the ball cock, said valve-housing sleeve having an axial length greater than that of said seat rings together with said ball;
    respective compressible seals engaged by the respective said connecting means at each of said ends of said valve-housing sleeve and extending into said bore; and respective tubular wear bushings, each disposed between a respective one of said connecting means and the outer face of the respective seat ring, each of said wear bushings comprising:

a compression sleeve axially extending between a respective one of said compressible seals and the outer face of the respective seat ring, said compression sleeve being outwardly supported by said peripheral cylindrical wall and axially braced at one end face against the respective one of said compressible seals and at another end face against the respective annular outer face of the seat ring, and a wear-resistance ceramic lining extending between one of said outer faces of the respective seat ring and the respective one of said compressible seals, a peripheral surface of each of said linings being outwardly supported by said compression sleeve and a wear surface opposite said peripheral surface being flush with said wear surface of the respective seat ring, so that wear surfaces of said linings, said rings and said ball are ceramic continuously over the entire axial length of said valve-housing sleeve.

2. The ball cock defined in claim 1 wherein said valve-housing sleeve has an axial length about twice the axial length of said seat rings plus said ball.

3. The ball cock defined in claim 1 wherein said compression sleeve each has a flange held in said valve-housing sleeve by countersunk screws threaded into said valve-housing sleeve.

4. The ball cock defined in claim 1 wherein said valve-housing sleeve is a thick-wall forged hollow cylindrical member and said shaft seal is received in a recess formed in said valve-housing sleeve.

5. The ball cock defined in claim 1 wherein said valve-housing sleeve is a thick-wall hollow cylinder formed from fiber-reinforced synthetic resin.

6. A ball cock for a fluid containing abrasive particles, comprising:

a generally cylindrical one-piece pressure-sustaining valve-housing sleeve with an axially extending bore having a peripheral cylindrical wall;

a sinter ceramic valve ball traversed by a passage and rotatable in said valve seat for controlling flow through the ball cock;

means forming a pair of sinter ceramic valve seat rings in said valve-housing sleeve spaced inwardly from said ends, each of said rings having an inner annular face abutting said valve ball, an outer annular face opposite said inner face and turned toward the respective end, said outer annular face constituting a compression face, an outer peripheral surface surrounded by and in contact with said peripheral cylindrical wall, and an axially extending wear surface constituting an inner peripheral surface of the respective ring;

an actuating shaft connected to said valve ball for rotating same, said valve-housing sleeve being formed with a transverse bore traversed by said shaft;

means forming a shaft seal at said transverse bore around said shaft for sealing same against escape of said fluid from the ball cock, said valve-housing sleeve having an axial length greater than that of said seat ring;

connecting means at each end of said valve-housing sleeve for connecting said valve-housing sleeve in a pipe line traversed by the fluid, said connecting means being received by said axially extending bore at each of said ends of said valve-housing sleeve and having a respective compression sleeve extending into said axially extending bore from the respective end, reaching to the respective compression face of the respective seat ring by a compression end, an opposite end of said compression sleeve forming a flange extending outwardly into said valve-housing sleeve and having an inwardly extending shoulder not projecting inwardly beyond said wear surface of said seat ring, an inner surface of said compression sleeve between said shoulder and the respective compression surface of the respective seat ring being recessed, so that said inner surface and said shoulder define a respective inwardly open annular chamber, and a respective ceramic lining received by said chamber of said compression sleeves and having an axially extending wear surface between the respective said compression face of the respective seat rings and the respective shoulder of said compression sleeve so that said wear surface is flush with the wear surface of the respective seat ring, and respective compressible seals engaged by said respective seat rings at each of said compression ends of said compression sleeve, said wear surfaces of said linings, said seat rings and said ball being composed of ceramic over substantially the entire length of said valve-housing sleeve from one of said shoulders to the other.

7. The ball cock defined in claim 6 wherein said valve-housing sleeve has an axial length about twice the axial length of said seat rings plus said ball.

8. The ball cock defined in claim 6 wherein said compression sleeves each has a flange held in said valve-housing sleeve by countersunk screws threaded into said valve-housing sleeve.

9. The ball cock defined in claim 6 wherein each of said flanges having a sealing boss projecting axially beyond each respective end face of the respective end of said valve-housing sleeve.

10. The ball cock defined in claim 6 wherein said seat rings and said valve ball are axially offset from the center of said valve-housing sleeve, so that an axial length of the compression sleeve on an inlet side of valve-housing sleeve is greater than one on an outlet side of the valve-housing sleeve.

11. The ball cock defined in claim 6 wherein said valve-housing sleeve is a thick-wall forged hollow cylindrical member and said shaft seal is received in a recess formed in said valve-housing sleeve.

12. The ball cock defined in claim 6 wherein said valve-housing sleeve is a thick-wall hollow cylinder formed from fiber-reinforced synthetic resin.

* * * * *